H. G. KOEHLER.
Hose and Pipe Coupling.
No. 167,675. Patented Sept. 14, 1875.
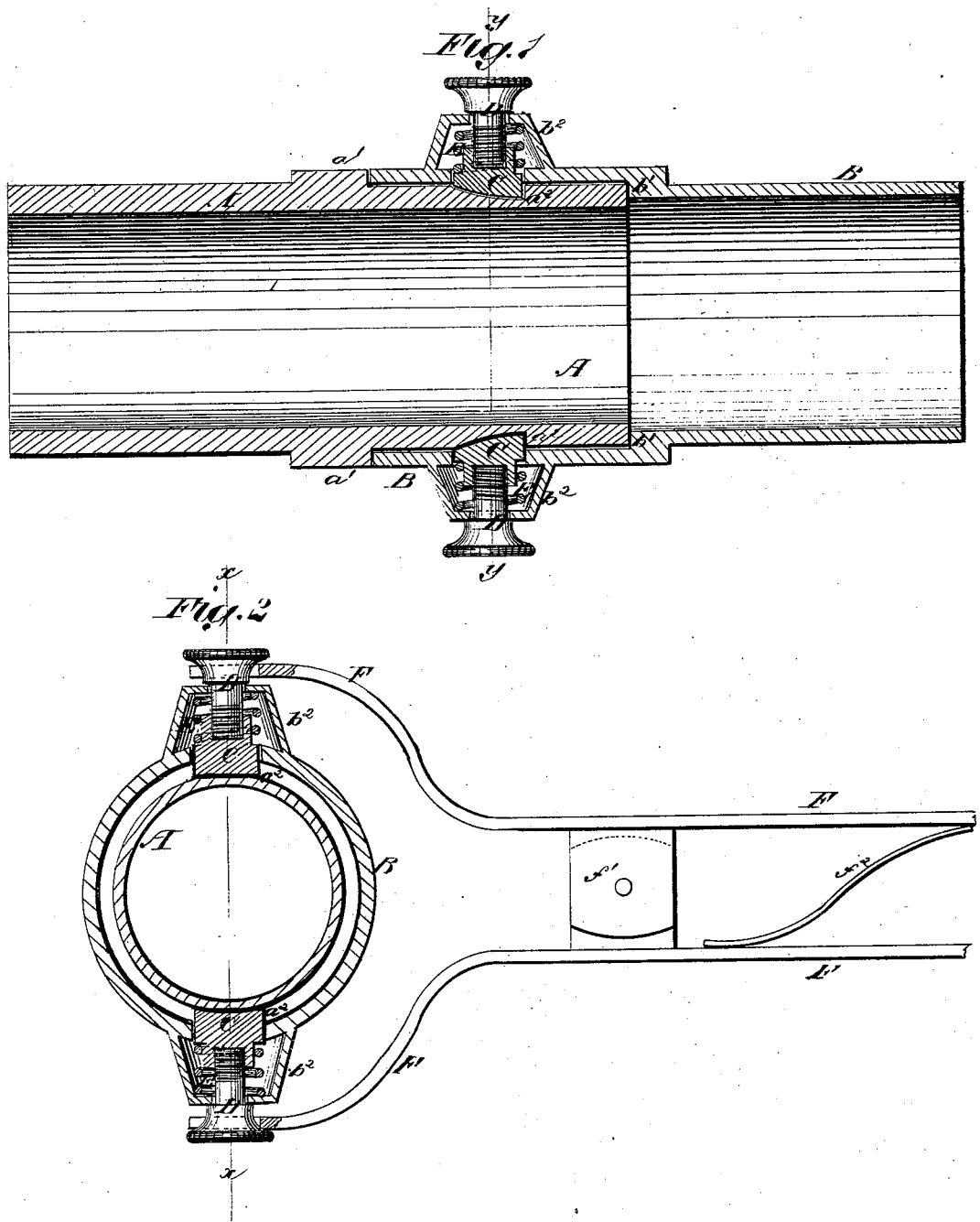
WITNESSES:
Francis McArdle.
Alex F. Roberts
INVENTOR:
H. G. Koehler
BY Munn & Co
ATTORNEYS.

UNITED STATES PATENT OFFICE.

HENRY G. KOEHLER, OF CLEVELAND, OHIO.

IMPROVEMENT IN HOSE AND PIPE COUPLINGS.

Specification forming part of Letters Patent No. 167,675, dated September 14, 1875; application filed August 14, 1875.

*To all whom it may concern:*

Be it known that I, HENRY G. KOEHLER, of Cleveland, in the county of Cuyahoga and State of Ohio, have invented a new and useful Improvement in Hose and Pipe Coupling, of which the following is a specification:

Figure 1 is a longitudinal section of my improved coupling, taken through the line $x\ x$, Fig. 2. Fig. 2 is a cross-section of the same, taken through the line $y\ y$, Fig. 1.

Similar letters of reference indicate corresponding parts.

The object of this invention is to furnish an improved revolving joint or swiveled coupling for hose and pipes, which shall be so constructed that the largest sized hose can be instantly coupled by a single man, and can be instantly uncoupled when desired, and which shall be simple in construction and reliable in use.

The invention consists in the combination of the part made with the external shoulder and the ring-groove, the part made with the internal shoulder and the hollow projections, the beveled catches, the screws, and the springs with each other, and in the combination of the tongs with the screws of the coupling, as hereinafter fully described.

A and B represent the two parts of the coupling. Upon the outer surface of the part A is formed a shoulder or collar, $a^1$, for the end of the part B to abut against, and upon the inner surface of the part B is formed a shoulder, $b^1$, for the end of the part A to abut against. Upon the outer surface of the part A, at a little distance from its end, is formed a ring-groove, $a^2$, to receive the catches C, which pass in through holes in the part B, and which are covered with projections $b^2$, made in the form of truncated hollow cones, and have holes in their outer ends for the screws D to pass through. The catches C are pressed inward by coiled springs E placed within the cavities of the projections $b^2$. The catches C are kept from being pressed in too far by the heads of the screws D striking against the projections $b^2$. The inner sides of the catches C are beveled off, so that they may be pushed out by the entering end of the part A, causing the coupling to couple itself as the two parts are pressed together. F is a pair of tongs, the forward parts of the arms of which are curved outward and forward, and their ends are notched to receive the necks of the screws D, so that the catches C may be drawn outward to uncouple the coupling by pressing the handles of the tongs together. The arms of the tongs F have lugs $f^1$ formed upon their inner sides, by which they are pivoted to each other. The handles of the tongs F are held apart by a spring, $f^2$, attached to one of said handles, and which presses against the other handle.

Having thus described my invention, I claim as new and desire to secure by Letters Patent—

1. The combination of the part A, made with the external shoulder $a^1$ and the ring-groove $a^2$, the part B, made with the internal shoulder $b^1$ and the hollow projections $b^2$, the beveled catches C, the screws D, and the springs E with each other, substantially as herein shown and described.

2. The combination of the tongs F $f^1$ $f^2$ with the screws D of the coupling A B C D E, substantially as herein shown and described.

HENRY GUSTAVE KOEHLER.

Witnesses:
THOS. J. HART,
HENRY TRENKAMP.